United States Patent
Darnaud et al.

(10) Patent No.: US 9,624,358 B2
(45) Date of Patent: Apr. 18, 2017

(54) RUBBER TIRE COMPOSITION COMPRISING AN AZO-SILANE COUPLING AGENT

(75) Inventors: Christelle Darnaud, Clermont-Ferrand (FR); José Carlos Araujo Da Silva, Clermont-Ferrand (FR); Karine Longchambon, Clermont-Ferrand (FR); Anne Veyland, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 287 days.

(21) Appl. No.: 14/008,620

(22) PCT Filed: Mar. 28, 2012

(86) PCT No.: PCT/EP2012/055519
§ 371 (c)(1),
(2), (4) Date: Mar. 26, 2014

(87) PCT Pub. No.: WO2012/130885
PCT Pub. Date: Oct. 4, 2012

(65) Prior Publication Data
US 2014/0228479 A1   Aug. 14, 2014

(30) Foreign Application Priority Data

Apr. 1, 2011 (FR) ...................................... 11 52831

(51) Int. Cl.
| C08K 3/36 | (2006.01) |
| C08K 5/5455 | (2006.01) |
| C08L 7/00 | (2006.01) |
| C08L 21/00 | (2006.01) |
| C08F 136/08 | (2006.01) |

(52) U.S. Cl.
CPC .......... *C08K 5/5455* (2013.01); *C08F 136/08* (2013.01); *C08K 3/36* (2013.01); *C08L 7/00* (2013.01); *C08L 21/00* (2013.01)

(58) Field of Classification Search
CPC   C08K 3/36; C08K 5/5455; C08L 7/00; C08L 21/00; C08F 136/08
USPC ....................................................... 523/156
See application file for complete search history.

(56) References Cited

U.S. PATENT DOCUMENTS

| 5,227,425 A | 7/1993 | Rauline |
| 5,852,099 A | 12/1998 | Vanel |
| 5,900,449 A | 5/1999 | Custodero et al. |
| 5,977,238 A | 11/1999 | Labauze |
| 6,013,718 A | 1/2000 | Cabioch et al. |
| 6,191,205 B1 | 2/2001 | Micouin et al. |
| 6,420,488 B1 | 7/2002 | Penot |
| 6,503,973 B2 | 1/2003 | Robert et al. |
| 6,815,473 B2 | 11/2004 | Robert et al. |
| 2001/0034389 A1 | 10/2001 | Vasseur |
| 2001/0056138 A1 | 12/2001 | Vasseur |
| 2003/0212185 A1 | 11/2003 | Vasseur |
| 2006/0089445 A1 | 4/2006 | Gandon-Pain |
| 2007/0112120 A1 | 5/2007 | Vasseur |
| 2009/0186961 A1 | 7/2009 | Araujo Da Silva et al. |
| 2009/0234066 A1 | 9/2009 | Araujo Da Silva et al. |
| 2014/0371345 A1* | 12/2014 | Darnaud .................. C08K 3/36 523/156 |

FOREIGN PATENT DOCUMENTS

| EP | 0501227 A1 | 9/1992 |
| EP | 0735088 A1 | 10/1996 |
| EP | 0810258 A1 | 12/1997 |
| EP | 0881252 A1 | 12/1998 |

(Continued)

OTHER PUBLICATIONS

International Search Report (PCT/ISA/210) mailed on Jun. 14, 2012, by the European Patent Office as the International Searching Authority for International Application No. PCT/EP2012/055519.

*Primary Examiner* — Angela C Scott
(74) *Attorney, Agent, or Firm* — Dickinson Wright PLLC

(57) ABSTRACT

The invention relates to a tire rubber composition based on at least one diene elastomer, an inorganic filler as reinforcing filler, a coupling agent providing the bonding between the inorganic filler and the diene elastomer, characterized in that the coupling agent is an azosilane compound of following formula (I):

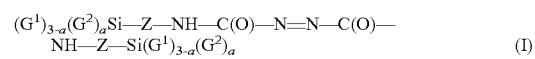

in which:
- $G^1$, identical to or different from one another, each represent a monovalent hydrocarbon-based group chosen from branched or unbranched, substituted or unsubstituted alkyls, having from 1 to 18 carbon atoms, substituted or unsubstituted cycloalkyls or aryls, having from 5 to 18 carbon atoms,
- $G^2$, identical to or different from one another, each represent a hydroxyl group or a monovalent group in the form $(G^3)_n$-$OG^1$ in which $G^3$ is a divalent linking group having from 1 to 18 carbon atoms and comprising one or more heteroatoms chosen from O, S, Si and N, n being a number equal to or higher than 0 and less than or equal to 18,
- Z represents a divalent linking group having from 1 to 18 carbon atoms,
- a is equal to 1, 2 or 3.

34 Claims, No Drawings

(56) References Cited

FOREIGN PATENT DOCUMENTS

| | | |
|---|---|---|
| EP | 1127909 A1 | 8/2001 |
| EP | 1285926 A1 | 2/2003 |
| EP | 1893681 B1 | 9/2009 |
| EP | 1893683 B1 | 8/2010 |
| FR | 2740778 A1 | 5/1997 |
| FR | 2765882 A1 | 1/1999 |
| WO | WO 97/36724 A2 | 10/1997 |
| WO | WO 99/02590 A1 | 1/1999 |
| WO | WO 99/06480 A1 | 2/1999 |
| WO | WO 99/16600 A1 | 4/1999 |
| WO | WO 99/28376 A2 | 6/1999 |
| WO | WO 00/05300 A1 | 2/2000 |
| WO | WO 00/05301 A1 | 2/2000 |
| WO | WO 00/73372 A1 | 12/2000 |
| WO | WO 01/92402 A1 | 12/2001 |
| WO | WO 02/10269 A2 | 2/2002 |
| WO | WO 02/053634 A1 | 7/2002 |
| WO | WO 03/002648 A1 | 1/2003 |
| WO | WO 03/002649 A1 | 1/2003 |
| WO | WO 2004/003067 A1 | 1/2004 |
| WO | WO 2004/056915 A1 | 7/2004 |
| WO | WO 2004/096865 A2 | 11/2004 |
| WO | WO 2006/069792 A1 | 7/2006 |
| WO | WO 2006/069793 A1 | 7/2006 |

* cited by examiner

RUBBER TIRE COMPOSITION COMPRISING AN AZO-SILANE COUPLING AGENT

BACKGROUND

Field

Disclosed herein are diene elastomer compositions reinforced with an inorganic filler, such as silica, intended for the manufacture of tires or tire semi-finished products, in particular for the treads of these tires.

More particularly, disclosed are coupling agents intended to provide the bonding, in such compositions, between these diene elastomers and these reinforcing inorganic fillers.

Description of Related Art

Major efforts have been made by tire designers, so as to reduce the consumption of fuel and the pollution emitted by motor vehicles, in order to obtain tires simultaneously exhibiting a very low rolling resistance, an improved grip both on a dry surface and on a wet or snowy surface, and a good wear resistance.

This has been made possible in particular by virtue of the development of novel elastomer compositions reinforced with specific inorganic fillers, described as "reinforcing", which exhibit a high dispersibility, which are capable of competing with conventional carbon black from the reinforcing viewpoint and which additionally afford these compositions a reduced hysteresis synonymous with a lower rolling resistance for the tires comprising them. Such rubber compositions, comprising reinforcing inorganic fillers, for example of the silica or alumina type, have been described, for example, in Patents or Patent Applications EP 501 227 or U.S. Pat. No. 5,227,425, EP 735 088 or U.S. Pat. No. 5,852,099, EP 810 258 or U.S. Pat. No. 5,900,449, EP 881 252, WO99/02590, WO99/06480, WO00/05300, WO00/05301 and WO02/10269.

The processability of the rubber compositions comprising such fillers nevertheless remains more difficult than for the rubber compositions conventionally comprising carbon black as filler. In particular, it is necessary to use a coupling agent, also referred to as bonding agent, the role of which is to provide the connection between the surface of the particles of inorganic filler and the elastomer while facilitating the dispersion of this inorganic filler within the elastomeric matrix.

It should be remembered here that (inorganic filler/elastomer) "coupling" agent has to be understood, in a known way, as meaning an agent capable of establishing a satisfactory connection, of chemical and/or physical nature, between the inorganic filler and the diene elastomer.

Such a coupling agent, which is at least bifunctional, has as a simplified general formula "Y—W—X", in which:

Y represents a functional group ("Y" functional group) which is capable of being physically and/or chemically bonded to the inorganic filler, it being possible for such a bond to be established, for example, between a silicon atom of the coupling agent and the surface hydroxyl (OH) groups of the inorganic filler (for example, the surface silanols, when silica is concerned);

X represents a functional group ("X" functional group) capable of being physically and/or chemically bonded to the diene elastomer, for example via a sulphur atom;

W represents a divalent group which makes it possible to connect "Y" and "X".

The coupling agents should in particular not be confused with simple covering agents for the inorganic filler which, in a known way, may comprise the Y functional group, active with regard to the inorganic filler, but are in any case devoid of the X functional group, active with regard to the diene elastomer.

Coupling agents, in particular (silica/diene elastomer) coupling agents, have been described in a large number of patent documents, the most well known being silane bifunctional sulphides, in particular alkoxysilanes, regarded today as the products contributing, for vulcanisates comprising silica as filler, the best compromise in terms of scorch safety, of ease of processability and of reinforcing power. Mention should very particularly be made, among these silane sulphides, of bis(3-triethoxysilylpropyl)tetrasulphide (abbreviated to TESPT), the reference coupling agent in tires with a low rolling resistance described as "Energy-saving Green Tires".

SUMMARY

There remains a need today to improve the performance of these coupling agents for inorganic fillers, such as silica.

The need is present in particular in the case of rubber matrices based on an isoprene elastomer, such as those used in the treads of tires for heavy-duty vehicles, in which, in a known way, an effective bond which the elastomer is much more difficult to obtain, in comparison with the use of carbon black.

While pursuing their research, the Applicant Companies have discovered a novel coupling agent which, alone but also in combination with other types of coupling agents, makes it possible to very significantly improve the performances of coupling to a diene elastomer, and in particular an isoprene elastomer.

Disclosed herein is a tire rubber composition based on at least one diene elastomer, an inorganic filler as reinforcing filler, a coupling agent providing the bonding between the inorganic filler and the diene elastomer, characterized in that the coupling agent is an azosilane compound of following formula (I)

$$(G^1)_{3-a}(G^2)_a Si\text{—}Z\text{—}NH\text{—}C(O)\text{—}N=N\text{—}C(O)\text{—}NH\text{—}Z\text{—}Si(G^1)_{3-a}(G^2)_a \quad \text{(I)}$$

in which:

$G^1$, identical to or different from one another, each represent a monovalent hydrocarbon group chosen from branched or unbranched, unsubstituted or substituted, alkyls, having from 1 to 18 carbon atoms, unsubstituted or substituted, cycloalkyls or aryls, having from 5 to 18 carbon atoms, $G^2$, identical to or different from one another, each represent a hydroxyl group or a monovalent group $(G^3)_n\text{-}OG^1$ in which 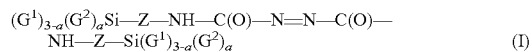 $G^3$ is a divalent bonding group having from 1 to 18 carbon atoms and comprising one or more heteroatoms chosen from O, S, Si and N, n being an integer equal to or higher than 0 and less than or equal to 18, Z represents a divalent bonding group having from 1 to 18 carbon atoms, a is equal to 1, 2 or 3.

Preferably, the diene elastomer is selected from the group consisting of polybutadienes, synthetic polyisoprenes, natural rubber, butadiene copolymers, isoprene copolymers and mixtures of these elastomers.

Preferably, the reinforcing inorganic filler is a siliceous or aluminous filler.

Also disclosed is a tire or semi-finished product comprising a rubber composition as described above, and it also relates to a tire tread comprising such a rubber composition.

Measurements and Tests Used

The rubber compositions are characterized, before and after curing, as indicated below.

Tensile Tests

These tensile tests make it possible to determine the moduli of elasticity and the properties at break and are based on the NF ISO 37 standard of December 2005.

The nominal secant modulus (or apparent stress, in MPa, relative to the strain, dimensionless) at 100% elongation (denoted as MA100) and at 300% elongation (denoted as MA300) is measured in second elongation (i.e., after a cycle of accommodation at the degree of extension intended for the measurement itself).

The true stresses at break (in MPa) and the elongations at break (in %) are also measured.

Dynamic Property

The dynamic property $\tan(\delta)_{max}$ is measured on a viscosity analyser (Metravib VA4000) according to the ASTM D 5992-96 standard. The response of a sample of vulcanized composition (cylindrical test specimen with a thickness of 4 mm and with a cross section of 400 mm$^2$), subjected to a sinusoidal stress in simple alternating shear, at a frequency of 10 Hz, according to the ASTM D 1349-99 standard is recorded. A strain amplitude sweep is carried out from 0.1% to 90% (outward cycle) and then from 90% to 0.1% (return cycle). The result exploited is the loss factor (tan δ). The maximum value of tan δ observed ($\tan(\delta)_{max}$) between the values at 0.1% and at 50% strain (Payne effect) are shown for the return cycle.

DETAILED DESCRIPTION OF SPECIFIC EMBODIMENTS

The compositions disclosed herein are therefore based on at least one diene elastomer, an inorganic filler as reinforcing filler and an azosilane compound of formula (I) as inorganic filler/diene elastomer coupling agent.

The expression composition "based on" should be understood in the present application as meaning a composition comprising the mixture and/or the reaction product of the various constituents used, some of these base constituents (for example, the coupling agent) being capable of reacting or intended to react with one another, at least in part, during the various phases of manufacture of the compositions, in particular during their vulcanization (curing).

In the present description, unless expressly indicated otherwise, all the percentages (%) shown are % by weight.

Diene Elastomer

The term "diene" elastomer or rubber should be understood as meaning, in a general manner, an elastomer resulting at least in part (i.e. a homopolymer or a copolymer) from diene monomers (monomers bearing two carbon-carbon double bonds which may or may not be conjugated).

The diene elastomers, in a known way, can be classified into two categories: "essentially unsaturated" or "essentially saturated". The term "essentially unsaturated" diene elastomer is understood to mean a diene elastomer resulting at least in part from conjugated diene monomers having a content of units of diene origin (conjugated dienes) which is greater than 15% (mol %); thus, for example, diene elastomers such as butyl rubbers or copolymers of dienes and of α-olefins of EPDM type do not come within the preceding definition and can on the contrary be described as "essentially saturated" diene elastomers (low or very low content of units of diene origin, always less than 15%). In the category of "essentially unsaturated" diene elastomers, the term "highly unsaturated" diene elastomer is understood to mean in particular a diene elastomer having a content of units of diene origin (conjugated dienes) which is greater than 50%.

Given these definitions, the term diene elastomer capable of being used in the compositions in accordance with the invention is understood more particularly to mean:

(a)—any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidene norbornene or dicyclopentadiene;

(d)—a copolymer of isobutene and of isoprene (butyl rubber) and also the halogenated versions, in particular chlorinated or brominated versions, of this type of copolymer.

Although it applies to any type of diene elastomer, a person skilled in the art of tires will understand that the present invention is preferably employed with essentially unsaturated diene elastomers, in particular of the type (a) or (b) above.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers may contain between 99% and 20% by weight of diene units and between 1% and 80% by weight of vinylaromatic units. The elastomers may have any microstructure which depends on the polymerization conditions used, in particular on the presence or absence of a modifying and/or randomizing agent and on the amounts of modifying and/or randomizing agent employed. The elastomers may, for example, be block, random, sequential or microsequential elastomers and may be prepared in dispersion or in solution; they may be coupled and/or star-branched or else functionalized with a coupling and/or star-branching or functionalization agent. Mention may be made, for example, for coupling to carbon black, of functional groups comprising a C—Sn bond or amino functional groups, such as benzophenone, for example; mention may be made, for example, for coupling to a reinforcing inorganic filler, such as silica, of silanol or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973). Mention may also be made, as other examples of functionalized elastomers, of elastomers (such as SBR, BR, NR or IR) of the epoxidized type.

The following are suitable: polybutadienes, in particular those having a content (molar %) of 1,2-units of between 4% and 80% or those having a content (molar %) of cis-1,4-units of greater than 80%, polyisoprenes, butadiene/styrene copolymers and in particular those having a $T_g$ (glass transition temperature, measured according to Standard ASTM D3418) of between 0° C. and −70° C. and more particularly between −10° C. and −60° C., a styrene content of between 5% and 60% by weight and more particularly between 20% and 50%, a content (molar %) of 1,2-bonds of the butadiene part of between 4% and 75% and a content (molar %) of trans-1,4-bonds of between 10% and 80%, butadiene/isoprene copolymers, in particular those having an isoprene content of between 5% and 90% by weight and a $T_g$ of −40° C. to −80° C., or isoprene/styrene copolymers, in particular those having a styrene content of between 5% and 50% by weight and a $T_g$ of between −25° C. and −50° C. In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (molar %) of 1,2-units of the butadiene part of between 4% and 85%, a content (molar %) of trans-1,4-units of the butadiene part of between 6% and 80%, a content (molar %) of 1,2-plus 3,4-units of the isoprene part of between 5% and 70% and a content (molar %) of trans-1,4-units of the isoprene part of between 10% and 50%, and more generally any butadiene/styrene/isoprene copolymer having a $T_g$ of between −20° C. and −70° C., are suitable in particular.

To sum up, in a particularly preferential manner, the diene elastomer of the composition in accordance with the invention is chosen from the group of (highly unsaturated) diene elastomers consisting of polybutadienes (BR), synthetic polyisoprenes (IR), natural rubber (NR), butadiene copolymers, isoprene copolymers and the mixtures of these elastomers. Such copolymers are more preferably selected from the group consisting of butadiene/styrene copolymers (SBR), isoprene/butadiene copolymers (BIR), isoprene/styrene copolymers (SIR) isoprene/butadiene/styrene copolymers (SBIR) and the mixtures of such copolymers.

According to a specific embodiment, the diene elastomer is predominantly (i.e. for more than 50 phr) an SBR, whether an SBR prepared in emulsion ("ESBR") or an SBR prepared in solution ("SSBR"), or an SBR/BR, SBR/NR (or SBR/IR), BR/NR (or BR/IR) or also SBR/BR/NR (or SBR/BR/IR) blend (mixture). In the case of an SBR (ESBR or SSBR) elastomer, use is made in particular of an SBR having a moderate styrene content, for example of between 20% and 35% by weight, or a high styrene content, for example from 35 to 45%, a content of vinyl bonds of the butadiene part of between 15% and 70%, a content (molar %) of trans-1,4-bonds of between 15% and 75% and a Tg of between −10° C. and −55° C.; such an SBR can advantageously be used as a mixture with a BR preferably having more than 90% (molar %) of cis-1,4-bonds.

According to another specific embodiment, the diene elastomer is predominantly (for more than 50 phr) an isoprene elastomer. This is the case in particular when the compositions of the invention are intended to constitute, in the tires, rubber matrices of certain treads (for example for industrial vehicles), of crown reinforcing plies (for example of working plies, protection plies or hoop plies), of carcass reinforcing plies, of sidewalls, of beads, of protectors, of underlayers, of rubber blocks and other internal rubbers providing the interface between the abovementioned regions of the tires.

The term "isoprene elastomer" is understood to mean, in a known manner, an isoprene homopolymer or copolymer, in other words a diene elastomer chosen from the group consisting of natural rubber (NR), synthetic polyisoprenes (IR), the various copolymers of isoprene and the mixtures of these elastomers. Mention will in particular be made, among isoprene copolymers, of isobutene/isoprene copolymers (butyl rubber—IIR), isoprene/styrene copolymers (SIR), isoprene/butadiene copolymers (BIR) or isoprene/butadiene/styrene copolymers (SBIR). This isoprene elastomer is preferably natural rubber or a synthetic cis-1,4-polyisoprene; use is preferably made, among these synthetic polyisoprenes, of the polyisoprenes having a content (molar %) of cis-1,4-bonds of greater than 90%, more preferably still of greater than 98%.

According to one particular embodiment, especially when it is intended for a tire sidewall, for an airtight inner liner of a tubeless tire (or other air-impermeable element), the composition in accordance with the invention may contain at least one essentially saturated diene elastomer, in particular at least one EPDM copolymer or one butyl rubber (optionally chlorinated or brominated), whether these copolymers are used alone or as a blend with highly unsaturated diene elastomers as mentioned above, in particular NR or IR, BR or SBR.

According to another preferred embodiment of the invention, the rubber composition comprises a blend of a (one or more) "high Tg" diene elastomer exhibiting a Tg of between −70° C. and 0° C. and of a (one or more) "low Tg" diene elastomer exhibiting a Tg of between −110° C. and −80° C., more preferably between −105° C. and −90° C. The high Tg elastomer is preferably chosen from the group consisting of S-SBRs, E-SBRs, natural rubber, synthetic polyisoprenes (exhibiting a level (molar %) of cis-1,4-structures preferably of greater than 95%), BIRs, SIRs, SBIRs and the mixtures of these elastomers. The low Tg elastomer preferably comprises butadiene units according to a level (molar %) at least equal to 70%; it preferably consists of a polybutadiene (BR) exhibiting a level (molar %) of cis-1,4-structures of greater than 90%.

According to another specific embodiment of the invention, the rubber composition comprises, for example, from 30 to 100 phr, in particular from 50 to 100 phr, of a high Tg elastomer as a blend with 0 to 70 phr, in particular from 0 to 50 phr, of a low Tg elastomer; according to another example, it comprises, for the whole of the 100 phr, one or more SBR(s) prepared in solution.

According to another specific embodiment of the invention, the diene elastomer of the composition according to the invention comprises a blend of a BR (as low Tg elastomer) exhibiting a level (molar %) of cis-1,4-structures of greater than 90% with one or more S-SBRs or E-SBRs (as high Tg elastomer(s)).

The compositions of the invention may contain a single diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

Inorganic Reinforcing Filler

The term "reinforcing inorganic filler" should be understood as meaning here, in a known way, any inorganic or mineral filler, whatever its colour and its origin (natural or synthetic), also known as "white" filler, "clear" filler or even "non-black" filler, in contrast with carbon black, this inorganic filler being capable of reinforcing, by itself alone, without means other than an intermediate coupling agent, a rubber composition intended for the manufacture of a tire tread, in other words capable of replacing, in its reinforcing role, a conventional tire-grade carbon black, especially for a tread. Such a filler is generally characterized, in a known way, by the presence of hydroxyl (—OH) groups, at its surface.

Preferably, the reinforcing inorganic filler is a filler of the siliceous or aluminous type or a mixture of these two types of fillers.

The silica ($SiO_2$) used can be any reinforcing silica known to a person skilled in the art, in particular any precipitated or pyrogenic silica exhibiting a BET specific surface and a CTAB specific surface which are both less than 450 $m^2/g$, preferably from 30 to 400 $m^2/g$. Highly dispersible precipitated silicas ("HDSs") are preferred, in particular when the invention is employed for the manufacture of tires exhibiting a low rolling resistance; mention may be made, as examples of such silicas, of the Ultrasil 7000 silicas from Degussa, the Zeosil 1165 MP, 1135 MP and 1115 MP silicas from Rhodia, the Hi-Sil EZ150G silica from PPG, the Zeopol 8715, 8745 or 8755 silicas from Huber.

The reinforcing alumina ($Al_2O_3$) preferably used is a highly dispersible alumina having a BET specific surface ranging from 30 to 400 $m^2/g$, more preferably between 60 and 250 $m^2/g$, and a mean particle size at most equal to 500 nm, more preferably at most equal to 200 nm. Mention may in particular be made, as nonlimiting examples of such reinforcing aluminas, of the Baikalox A125 or CR125 (Baïkowski), APA-100RDX (Condea), Aluminoxid C (Degussa) or AKP-G015 (Sumitomo Chemicals) aluminas.

Mention may also be made, as other examples of inorganic filler capable of being used in the rubber compositions of the treads of the invention, of aluminium (oxide) hydroxides, aluminosilicates, titanium oxides, silicon carbides or nitrides, all of the reinforcing type as described, for example, in Applications WO 99/28376, WO 00/73372, WO 02/053634, WO 2004/003067 and WO 2004/056915.

When the treads of the invention are intended for tires with a low rolling resistance, the reinforcing inorganic filler used, in particular if it is silica, preferably has a BET specific surface of between 60 and 350 $m^2/g$. An advantageous embodiment of the invention consists in using a reinforcing inorganic filler, in particular a silica, having a high BET specific surface within a range from 130 to 300 $m^2/g$, due to the high reinforcing power recognized for such fillers. According to another preferred embodiment of the invention, use may be made of a reinforcing inorganic filler, in particular a silica, exhibiting a BET specific surface of less than 130 $m^2/g$, preferably in such a case of between 60 and 130 $m^2/g$ (see, for example, Applications WO 03/002648 and WO 03/002649).

The physical state under which the reinforcing inorganic filler is provided is not important, whether it is in the form of a powder, of microbeads, of granules, of balls or any other appropriate densified form. Of course, the term reinforcing inorganic filler is also understood to mean mixtures of different reinforcing inorganic fillers, in particular of highly dispersible siliceous and/or aluminous fillers as described above.

A person skilled in the art will know how to adjust the level of reinforcing inorganic filler according to the nature of the inorganic filler used and according to the type of tire concerned, for example a tire for a motorcycle, for a passenger vehicle or for a utility vehicle, such as a van or a heavy-duty vehicle. Preferably, this level of reinforcing inorganic filler will be chosen between 20 and 200 phr, more preferably between 30 and 150 phr, in particular greater than 50 phr and more preferably comprised between 60 and 140 phr.

In the present account, the BET specific surface is determined in a known way by gas adsorption using the Brunauer-Emmett-Teller method described in "*The Journal of the American Chemical Society*", Vol. 60, page 309, February 1938, more specifically according to French Standard NF ISO 9277 of December 1996 (multipoint volumetric method (5 points)—gas: nitrogen—degassing: 1 hour at 160° C.—relative pressure range p/po: 0.05 to 0.17). The CTAB specific surface is the external surface determined according to French Standard NF T 45-007 of November 1987 (method B).

Finally, a person skilled in the art will understand that a reinforcing filler of another nature, in particular an organic filler, might be used as equivalent filler to the reinforcing inorganic filler described in the present section, provided that this reinforcing filler is covered with an inorganic layer, such as silica, or else comprises, at its surface, functional sites, in particular hydroxyl sites, requiring the use of a coupling agent in order to establish the bonding between the filler and the elastomer. Mention may be made, as examples of such organic fillers, of functionalized polyvinylaromatic organic fillers, such as described in Applications WO 2006/069792 and WO 2006/069793.

The reinforcing inorganic filler may also be used combined with an organic reinforcing filler, in particular carbon black, for example a black of the HAF, ISAF or SAF type, conventionally used in tires and particularly in tire treads, (for example N115, N134, N234, N326, N330, N339, N347 or N375 blacks, or else, depending on the applications targeted, the blacks of higher series, for example N660, N683 or N772). These carbon blacks may be used in the isolated state, as available commercially, or in any other form, for example as a support for some of the rubber additives used. The carbon blacks might, for example, be already incorporated into the elastomer in the form of a masterbatch (see, for example, Applications WO 97/36724 or WO 99/16600).

The amount of carbon black present in the total reinforcing filler may vary to a large extent; it is preferably less than that of the reinforcing metal hydroxide. Advantageously, carbon black is used in a very small proportion, at a preferred content of less than 10 phr. In the ranges indicated, the colouring properties (black pigmenting agent) and UV-stabilizing properties of the carbon blacks are benefited from, without, moreover, adversely affecting the typical performances provided by the reinforcing inorganic filler. Of course, the composition of the invention may itself be completely free of carbon black.

Coupling Agent

The azosilane compound according to the invention, used as a coupling agent, has the following formula:

$$(G^1)_{3-a}(G^2)_a Si\text{—}Z\text{—}NH\text{—}C(O)\text{—}N\text{=}N\text{—}C(O)\text{—}NH\text{—}Z\text{—}Si(G^1)_{3-a}(G^2)_a \quad (I)$$

in which:
  $G^1$, identical to or different from one another, each represent a monovalent hydrocarbon group chosen from branched or unbranched, unsubstituted or substituted, alkyls, having from 1 to 18 carbon atoms, unsubstituted or substituted, cycloalkyls or aryls, having from 5 to 18 carbon atoms, $G^2$, identical to or different from one another, each represent a hydroxyl group or a monovalent group $(G^3)_n$-$OG^1$ in which $G^3$ is a divalent linking group having from 1 to 18 carbon atoms and comprising one or more heteroatoms chosen from O, S, Si and N, n being a number equal to or higher than 0 and less than or equal to 18, Z represents a divalent linking group having from 1 to 18 carbon atoms, a is equal to 1, 2 or 3.

In the above formula (I), a person skilled in the art will immediately understand that the functional group (recorded as "X" in the introduction to the present patent application) intended to provide the bonding with the diene elastomer is provided by the central azodicarbamide (NH—C(O)—N=N—C(O)—NH) group, while two functional groups (recorded as "Y" in the introduction to the present patent application) intended to provide the bonding with the reinforcing inorganic filler are provided by the silyl groups which carry at least one hydroxyl or hydrolysable group attached to their silicon atom.

Advantageously, Z may comprise one or more heteroatoms chosen from O, S, N and Si.

Preferably, a is equal to 3.

Advantageously, Z is chosen from $C_1$-$C_{18}$ alkylenes and $C_6$-$C_{12}$ arylenes, preferably $C_1$-$C_{10}$ alkylenes, more preferably Z is chosen from $C_1$-$C_4$ alkylenes, and more preferably still Z is a propylene.

According to an advantageous embodiment of the invention, n is equal to or higher than 1.

Preferably, $G^3$ is a $C_1$-$C_{12}$ oxy-alkylene, more preferably $G^3$ is a $C_1$-$C_4$ oxy-alkylene, and more preferably still $G^3$ is an oxy-ethylene oxy-propylene.

The following coupling agents of formula (I) are particularly well suited to the invention:

(EtO)$_3$Si—CH$_2$—NH—CO—N=N—CO—NH—CH$_2$—Si(OEt)$_3$, (EtO)$_3$Si—CH$_2$—CH$_2$—NH—CO—N=N—CO—NH—CH$_2$—CH$_2$—Si(OEt)$_3$, (EtO)$_3$Si—CH$_2$—CH$_2$—CH$_2$—NH—CO—N=N—CO—NH—CH$_2$—CH$_2$—CH$_2$—Si(OEt)$_3$, (EtO)$_3$Si—CH$_2$—CH$_2$—CH$_2$—CH$_2$—NH—CO—N=N—CO—NH—CH$_2$—CH$_2$—CH$_2$—CH$_2$—Si(OEt)$_3$, (EtO)$_3$Si—(CH$_2$)$_{11}$—NH—CO—N=N—CO—NH—(CH$_2$)$_{11}$—Si(OEt)$_3$, (EtO)$_3$Si—(CH$_2$)$_{12}$—NH—CO—N=N—CO—NH—(CH$_2$)$_{12}$—Si(OEt)$_3$, (EtO)$_3$Si—CH$_2$CH(CH$_3$)CH$_2$—NH—CO—N=N—CO—NH—CH$_2$CH(CH$_3$)CH$_2$—Si(OEt)$_3$, (EtO)$_3$Si—CH$_2$—CH$_2$—C$_6$H$_4$—CH$_2$—NH—CO—N=N—CO—NH—CH$_2$—C$_6$H$_4$—CH$_2$—CH$_2$—Si(OEt)$_3$, (EtO)$_3$Si—CH$_2$—CH$_2$—C$_6$H$_4$—NH—CO—N=N—CO—NH—C$_6$H$_4$—CH$_2$—CH$_2$—Si(OEt)$_3$, (MeO)$_3$Si—CH$_2$—NH—CO—N=N—CO—NH—CH$_2$—Si(OMe)$_3$, (MeO)$_3$Si—CH$_2$—CH$_2$—NH—CO—N=N—CO—NH—CH$_2$—CH$_2$—Si(OMe)$_3$, (MeO)$_3$Si—CH$_2$—CH$_2$—CH$_2$—NH—CO—N=N—CO—NH—CH$_2$—CH$_2$—CH$_2$—Si(OMe)$_3$, (MeO)$_3$Si—CH$_2$—CH$_2$—CH$_2$—CH$_2$—NH—CO—N=N—CO—NH—CH$_2$—CH$_2$—CH$_2$—CH$_2$—Si(OMe)$_3$, (MeO)$_3$Si—(CH$_2$)$_{11}$—NH—CO—N=N—CO—NH—(CH$_2$)$_{11}$—Si(OMe)$_3$, (MeO)$_3$Si—(CH$_2$)$_{12}$—NH—CO—N=N—CO—NH—(CH$_2$)$_{12}$—Si(OMe)$_3$, (MeO)$_3$Si—CH$_2$CH(CH$_3$)CH$_2$—NH—CO—N=N—CO—NH—CH$_2$CH(CH$_3$)CH$_2$—Si(OMe)$_3$, (MeO)$_3$Si—CH$_2$—CH$_2$—C$_6$H$_4$—CH$_2$—NH—CO—N=N—CO—NH—CH$_2$—C$_6$H$_4$—CH$_2$—CH$_2$—Si(OMe)$_3$, (MeO)$_3$Si—CH$_2$—CH$_2$—C$_6$H$_4$—NH—CO—N=N—CO—NH—C$_6$H$_4$—CH$_2$—CH$_2$—Si(OMe)$_3$, (EtO)(RO)$_2$Si—CH$_2$—CH$_2$—CH$_2$—NH—CO—N=N—CO—NH—CH$_2$—CH$_2$—CH$_2$—Si(OEt)(OR)$_2$, (RO)(EtO)$_2$Si—CH$_2$—CH$_2$—CH$_2$—NH—CO—N=N—CO—NH—CH$_2$—CH$_2$—CH$_2$—Si(OR)(OEt)$_2$ with Me=methyl, Et=ethyl and R=$C_{13}H_{27}(OCH_2CH_2)_5$.

Among these, particularly suitable for the invention, of formula (I)° are: the compound 1,2-azodicarboxylic acid, bis(3-aminopropyltriethoxysilane)amide of formula (I-a):

(EtO)$_3$Si—(CH$_2$)$_3$—NH—CO—N=N—CO—NH—(CH$_2$)$_3$—Si(OEt)$_3$, and also the compounds of respective formula (I-b) and (I-c) below:

(EtO)(RO)$_2$Si—CH$_2$—CH$_2$—CH$_2$—NH—CO—N=N—CO—NH—CH$_2$—CH$_2$—CH$_2$—Si(OEt)(OR)$_2$, (I-b):

(RO)(EtO)$_2$Si—CH$_2$—CH$_2$—CH$_2$—NH—CO—N=N—CO—NH—CH$_2$—CH$_2$—CH$_2$—Si(OR)(OEt)$_2$ (I-b):

where Et=ethyl and R=$C_{13}H_{27}(OCH_2CH_2)_5$.

The azosilane compounds of formula (I):

$(G^1)_{3-a}(G^2)_a$Si—Z—NH—C(O)—N=N—C(O)—NH—Z—Si$(G^1)_{3-a}(G^2)_a$ $(G^1)_{3-a}(G^2)_a$Si—Z—NH—C(O)—N=N—C(O)—NH—Z—Si$(G^1)_{3-a}(G^2)_a$ according to the invention, may be prepared via an acylation reaction between an azobiscarboxy compound of formula (A):

$G^4$-$Z'$—C(O)—N=N—C(O)—$Z'$-$G^4$ and an aminosilane compound of formula (B):

$(G^1)_{3-a}(G^2)_a$Si—Z—NH$_2$ in which:

$Z'$, which are identical or different, each represent an oxygen atom, an NH or N-$A^1$ radical, where $A^1$ is a $C_1$-$C_{12}$ alkyl or aryl group;

$G^4$, which are identical or different, each represent a hydrogen atom, a $C_1$-$C_{18}$ alkyl group, a benzyl (—CH$_2$—C$_6$H$_5$) group or a (CH$_2$—CH$_2$—O)$_p$-$G^5$ or (CH(CH$_3$)—CH$_2$—O)$_p$-$G^5$ alkyl group, where p is between 1 and 18 and $G^5$, which are identical or different, represent a saturated or unsaturated, branched or unbranched, $C_1$-$C_{32}$ monovalent hydrocarbon-based chain.

The aminosilanes of general formula B may be produced by transesterification of aminosilanes also of formula B in which $G^2$ is an OH group, a substituted or unsubstituted $C_1$-$C_{18}$ alkoxy group, a $C_5$-$C_{18}$ alkoxy group or cycloalkoxy group, with an HO(CH$_2$—CH$_2$—O)$_n$—R3 or HO(CH(CH$_3$)—CH$_2$—O)$_n$—R3 group, as described in particular in European patent EP 1 285 926.

The acylation reaction is preferably carried out in the presence of a solvent, in particular a non-alcoholic solvent, under an inert atmosphere, at a temperature preferably between −25° C. and 25° C.

According to one embodiment of the invention, the composition comprises a second coupling agent used as a blend with the azosilane compound of formula (I).

Particularly suitable for this second coupling agent are the silane sulphide compounds corresponding to the formula (II):

$$Y^1—Z^1—S_x—Z^2—Y^2 \quad (II)$$

in which:
x is a decimal number ranging from 2 to 8, preferably from 2 to 5;
$Z^1$ and $Z^2$, which are identical or different, each represent a divalent hydrocarbon radical comprising from 1 to 18 carbon atoms;
$Y^1$ and $Y^2$, which are identical or different, each correspond to one of the following formulae:

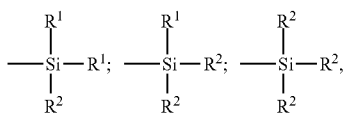

in which:
the $R^1$ radicals, which are unsubstituted or substituted and identical to or different from one another, represent a $C_1$-$C_{18}$ alkyl, $C_5$-$C_{18}$ cycloalkyl or $C_6$-$C_{18}$ aryl group;
the $R^2$ radicals, which are unsubstituted or substituted and identical to or different from one another, represent a hydroxyl, $C_1$-$C_{18}$ alkoxyl or $C_5$-$C_{18}$ cycloalkoxyl group.

Preferably, $Z^1$ and $Z^2$ are selected from the group consisting of $C_1$-$C_{10}$ alkylenes, preferably $C_1$-$C_4$ alkylenes, and more preferably $Z^1$ and $Z^2$ represent propylene.

According to an embodiment variant of the invention, the $R^1$ radicals are chosen from $C_1$-$C_4$ alkyls, preferably they represent methyl.

According to another characteristic, the $R^2$ radicals are chosen from the group consisting of hydroxyl and $C_1$-$C_4$ alkoxyls, preferably from the group consisting of hydroxyl, methoxyl and ethoxyl.

A person skilled in the art will know how to adjust the content of organosilane of formula (I) as a function of the particular embodiments of the invention, especially of the amount of reinforcing inorganic filler used, the preferred content representing between 2% and 20% by weight relative to the amount of reinforcing inorganic filler; contents of less than 15% are more particularly preferred.

Thus preferably, the overall content of coupling agent is between 2 and 15 phr, more preferably between 2 and 12 phr.

Various Additives

The rubber compositions in accordance with the invention can also comprise all or some of the usual additives generally used in elastomer compositions intended for the manufacture of tires, especially of treads, such as, for example, plasticizing agents or extending oils, whether the latter are aromatic or nonaromatic in nature, pigments, protection agents, such as antiozone waxes, chemical antiozonants, antioxidants, antifatigue agents, reinforcing resins, methylene acceptors (for example, phenolic novolac resin) or methylene donors (for example, HMT or H3M), such as described, for example, in Application WO 02/10269, a crosslinking system based either on sulphur or on sulphur donors and/or on peroxide and/or on bismaleimides, vulcanization accelerators or vulcanization activators.

Preferably, these compositions comprise, as preferred nonaromatic or very slightly aromatic plasticizing agent, at least one compound chosen from the group consisting of naphthenic oils, paraffinic oils, MES oils, TDAE oils, glycerol esters (in particular trioleates), plasticizing hydrocarbon resins exhibiting a high Tg preferably of greater than 30° C., and the mixtures of such compounds.

These compositions can also comprise, in addition to the coupling agents, coupling activators, covering agents (comprising for example, the single functional group Y) for covering the reinforcing inorganic filler or more generally processing aids capable, in a known way, by virtue of an improvement in the dispersion of the inorganic filler in the rubber matrix and of a lowering in the viscosity of the compositions, of improving their processability in the raw state, these aids being, for example, hydroxylated or hydrolysable silanes, such as alkylalkoxysilanes (in particular alkyltriethoxysilanes), polyols, polyethers (for example polyethylene glycols), esters, primary, secondary or tertiary amines (for example trialkanolamines), hydroxylated or hydrolysable POSs, mixtures of such compounds, for example α,ω-dihydroxypolyorganosiloxanes (in particular α,ω-dihydroxypolydimethylsiloxanes), or fatty acids such as for example stearic acid.

Inert fillers (i.e. nonreinforcing fillers), such as particles of clay, bentonite, talc, chalk, kaolin, which can be used, for example, in sidewalls or treads of coloured tires, can also be added, depending on the targeted application, to the reinforcing filler described above, that is to say the reinforcing inorganic filler plus carbon black, if appropriate.

Crosslinking System

The crosslinking system is preferably a vulcanization system, that is to say a system based on sulphur (or on a sulphur-donor) and on a primary vulcanization accelerator. Various known vulcanization activators or secondary accelerators, such as zinc oxide, stearic acid or equivalent compounds, guanidine derivatives (in particular diphenylguanidine), or else known vulcanization retarders, are added to this base vulcanization system, incorporated during the non-productive first phase and/or during the productive phase as described below.

Sulphur is used at a preferable level of between 0.5 and 12 phr, in particular of between 1 and 10 phr. The primary vulcanization accelerator is used at a preferable level of between 0.5 and 10 phr, more preferably of between 0.5 and 5.0 phr.

Use may be made, as (primary or secondary) accelerator, of any compound capable of acting as accelerator of the vulcanization of diene elastomers in the presence of sulphur, in particular accelerators of the thiazole type and also their derivatives, accelerators of the thiuram and zinc dithiocarbamate types. These accelerators are for example selected from the group consisting of 2-mercaptobenzothiazyl disulphide (abbreviated to MBTS), tetrabenzylthiuram disulphide (TBZTD), N-cyclohexyl-2-benzothiazyl sulphenamide (CBS), N,N-dicyclohexyl-2-benzothiazyl sulphenamide (DCBS), N-tert-butyl-2-benzothiazyl sulphenamide (TBBS), N-tert-butyl-2-benzothiazyl sulphenimide (TBSI), zinc dibenzyldithiocarbamate (ZBEC), 1-phenyl-2,4-dithiobiuret (DTB), zinc dibutylphosphorodithioate (ZBPD), zinc 2-ethylhexylphosphorodithioate (ZDT/S), bis[O,O-di(2-ethylhexyl)thiophosphonyl]disulphide (DAPD), dibutylthiourea (DBTU), zinc isopropyl xanthate (ZIX), zinc dialkyl dithiophosphate, copper dialkyl dithiophosphate, dialkyl thiophosphoryl polysulphides, dialkyl dithiophosphoryl derivatives (such as zinc salts, cobalt salts, polysulphides, etc.) and the mixtures of these compounds.

Manufacture of the Rubber Compositions

The rubber compositions of the invention are manufactured in appropriate mixers using two successive preparation phases according to a general procedure well known to a person skilled in the art: a first phase of thermomechanical working or kneading (sometimes described as "non-productive" phase) at high temperature, up to a maximum temperature of between 130° C. and 200° C., preferably between 145° C. and 185° C., followed by a second phase of mechanical working (sometimes described as "productive" phase) at a lower temperature, typically of less than 120° C., for example between 60° C. and 100° C., during which finishing phase the crosslinking or vulcanization system is incorporated.

According to one preferred embodiment of the invention, all the base constituents of the compositions of the invention, with the exception of the vulcanization system, namely the reinforcing inorganic filler, the coupling agent of formula (I) and the carbon black, are intimately incorporated, by kneading, into the diene elastomer during the so-called non-productive first phase, that is to say at least these various base constituents are introduced into the mixer and thermomechanically kneaded, in one or more steps, until the maximum temperature between 130° C. and 200° C., preferably between 145° C. and 185° C., is reached.

By way of example, the first (non-productive) phase is carried out in a single thermomechanical stage during which all the necessary constituents, the optional complementary covering agents or processing aids and other various additives, with the exception of the vulcanization system, are introduced into a suitable mixer, such as a standard internal mixer. The total kneading time in this non-productive phase is preferably between 1 and 15 min. After cooling the mixture obtained in this way during the non-productive first phase, the vulcanization system is then incorporated at low temperature, generally in an external mixer such as an open mill. All the ingredients are then mixed (productive phase) for a few minutes, for example between 2 and 15 min.

The covering agent, where appropriate, may be incorporated completely during the non-productive phase (i.e. in the internal mixer), at the same time as the inorganic filler, or else completely during the productive phase (in the external mixer), or else partly over the two successive phases.

The final composition thus obtained is then calendered, for example in the form of a sheet or a slab, especially for laboratory characterization, or else extruded in the form of a rubber profiled element that can be used for example as a tire tread for a passenger vehicle.

The vulcanization (or curing) is carried out in a known manner at a temperature generally between 130° C. and 200° C., for a sufficient time, which may for example vary between 5 and 90 minutes, depending in particular on the curing temperature, on the vulcanization system adopted and on the vulcanization kinetics of the composition in question.

The invention relates to the rubber compositions described previously both in the "raw" state (i.e. before curing) and in the "cured" or vulcanized state (i.e. after crosslinking or vulcanization). The compositions in accordance with the invention may be used alone or as a blend (i.e. as a mixture) with any other rubber composition that can be used for the manufacture of tires.

Exemplary Embodiments of the Invention

Synthesis of the Azosilane of Formula (I-a)
Base Ingredients:
diisopropyl azodicarboxylate (Jayhawk Chemicals) with a purity of more than 94%;
3-aminopropyl(triethoxysilane) sold by Evonik Degussa GmbH with a purity of more than 98%;
pentane and isopropanol sold by Aldrich, Acros and Merck-Schuchardt.

164.2 g (742 mmol) of 3-aminopropyl(triethoxysilane) are used as initial charge in 1000 g of pentane at 0° C. in a flask under an inert atmosphere, and this mixture is stirred. 75 g of diisopropyl azodicarboxylate (DIAD, 371 mmol) are added dropwise, from −5° C. to 5° C., to the solution over a period of 30. The stirring is continued for an additional 30 minutes from −5° C. to 5° C. The cooling bath is then removed and the solution is stirred for 180 minutes, until the temperature of the mixture reaches ambient temperature. All the volatile compounds (pentane, isopropanol) are then removed on a rotary evaporator at a pressure ranging up to 6 mbar.

NMR studies show that the red oil obtained (194 g, yield of more than 99%) comprises the azosilane at a purity of more than 85 mol %.

Synthesis of the Azosilane of Formula (I-c)

Under an argon atmosphere a transesterification of 100 g of 3-aminopropyl(triethoxysilane) (451 mmol) is carried out at 130° C. with isotridecanol poly(oxyethylene) (903 mmol). The ethanol formed (903 mmol) is distilled under vacuum (400 mbar abs). The residual silane is then dissolved in n-pentane and cooled to 0° C. An acylation is then carried out, while stirring, with DIAD (diisopropylazodicarboxylate; 1:2 DIAD/silane molar ratio) and while continuing to stir the solution and maintaining the temperature between −5° C. and 5° C. Next, the solution is stirred for 30 min at 0° C. then at ambient temperature for 180 min. The pentane and isopropanol are then evaporated on a rotary evaporator under vacuum (up to 6 mbar abs).

The azosilane is obtained with a yield of more than 99% and is in the form of a luminous red viscous liquid with a purity of the azosilane of more than 85 mol % (NMR).

Synthesis of the Azosilane of Formula (I-b)

The azosilane compound of formula (I-b) is synthesized in an identical manner to that of the azosilane of formula (I-c) described in the preceding section with the exception, for the transesterification, of the amount of isotridecanol poly(oxyethylene) used, which is halved relative to the synthesis described above.

Synthesis of the Azosilane of Formula (III)

The azosilane of formula (III):

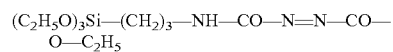

is synthesized in two stages, in accordance with the embodiment described in Patent EP 1 893 681, as follows:

by reaction of a silane isocyanate with an ethyl carbazate to form a hydrazino precursor, according to the following reaction scheme:

(C$_2$H$_5$O)$_3$Si—(CH$_2$)$_3$—NCO+H$_2$N—NH—CO—O—C$_2$H$_5$→(C$_2$H$_5$O)$_3$Si—(CH$_2$)$_3$NH—CO—NH—NH—CO—O—C$_2$H$_5$ then the oxidation of the above precursor to obtain the compound ethyl-N-(3-triethoxysilylpropyl)carbamoylazoformate.

Synthesis of the Precursor Ingredient:

a) Charges:

| 96% isocyanatopropyltriethoxysilane | 99.8 g | 384 mmol |
| ethyl carbazate | 41.2 g | 384 mmol |
| anhydrous toluene | 384 ml | — | b) Procedure:

The ethyl carbazate and the anhydrous toluene are charged at ambient temperature (23° C.) to the reactor, which is placed under an argon atmosphere. The reactor is stirred at 300 rpm and the reaction mixture is then heated to 60° C. The reaction mixture becomes virtually homogeneous at high temperature. The 99.8 g of silane are then added over 60 min using a pressure-equalizing dropping funnel. The reaction mixture is kept stirring for 2 hours at 60° C. before returning to ambient temperature. The reaction mixture is left standing at ambient temperature for several hours. A white solid crystallizes. It is then filtered, washed with 2×150 ml of isopropyl ether then suction-dried. The solid is finally dried in an oven at 60° C. to a constant weight equal to 131.5 g. The product is analysed by NMR (molar purity >99%). Yield=97.4%.

Synthesis of the Compound of Formula III (Final Azosilane):

The azosilane of formula III is obtained in one stage from the precursor by oxidation of the hydrazino functional group to give an azo functional group using an oxidizing system based on N-bromosuccinimide (NBS) and pyridine, which are added in stoichiometric amounts with respect to the precursor.

a) Charges:

| precursor | 20.0 g | 57 mmol |
| 99% N-bromosuccinimide | 10.13 g | 57 mmol |
| pyridine | 4.5 g | 57 mmol |
| dichloromethane | 100 ml | — | b) Procedure:

The precursor, the pyridine and the dichloromethane are charged to a reactor, which is placed under an argon atmosphere; the reaction medium is homogeneous and virtually colourless. The N-bromosuccinimide is added over 30 minutes using a spatula. The temperature is kept below 25° C. The reaction medium turns bright orange from the first addition of NBS. The reaction medium is kept stirring at ambient temperature for 2 hours after the end of the addition of the NBS. The reaction medium is concentrated under reduced pressure on a rotary evaporator.

The residue, which is in the form of an orangey paste, is taken up in 100 ml of a heptane/iPr$_2$O (1/1: vol/vol) mixture and then filtered through sintered glass funnel (125 ml) with a porosity of 4. The filter cake is washed with 4×25 ml of additional preceding solvent mixture. The mother liquors are filtered a second time through the cake. The filtrate is concentrated under reduced pressure. An odourless bright orange liquid is obtained: w=18.8 g.

This liquid is analysed by NMR and its molar composition is as follows (mol %):

azosilane of formula III: 94.5%;
precursor compound: 0.2%;
succinimide: 5%;
pyridine residues: 0.3%.

Preparation of the Rubber Compositions

The tests which follow are carried out in the following way: the diene elastomer, the silica, supplemented with a small amount of carbon black, the coupling agent and then, after kneading for one to two minutes, the various other ingredients, with the exception of the vulcanization system, are introduced into an internal mixer, 70% filled and having an initial vessel temperature of approximately 90° C. Thermomechanical working (non-productive phase) is then carried out in one stage (total duration of the kneading equal to approximately 5 min) until a maximum "dropping" temperature of approximately 165° C. is reached. The mixture thus obtained is recovered and cooled and then the covering agent (when the latter is present) and the vulcanization system (sulphur and sulphenamide accelerator) are added on an external mixer (homofinisher), at 50° C., the combined mixture being mixed (productive phase) for approximately 5 to 6 min.

The compositions thus obtained are subsequently calendered, either in the form of slabs (thickness of 2 to 3 mm) or of fine sheets of rubber, for the measurement of their physical or mechanical properties, or in the form of profiled elements which can be used directly, after cutting and/or assembling to the desired dimensions, for example as tire semi-finished products, in particular as tire treads.

Test 1

The objective of this test is to demonstrate the improved properties of a rubber composition according to the invention comprising a novel coupling agent compared with a control composition using a coupling agent conventionally used in rubber compositions for tire treads having silica as reinforcing filler.

For this, four compositions based on a diene elastomer (natural rubber, NR) reinforced with a highly dispersible silica (HDS) were prepared, these compositions essentially differing by the following technical characteristics:

composition C1 is a first control composition containing the compound TESPT (trade name: "Si69") as coupling agent, composition C2 is a composition according to the invention comprising the azosilane compound of formula (I-a) as coupling agent with a number of moles identical to that of the TESPT of the first control composition (isomolar amount of silicon), the structure of the molecules of TESPT having the same number of functions providing bonding with the filler and with the elastomer as the coupling agent of formula (I-a) according to the invention, composition C3 is a second control composition containing the azosilane compound of formula (III), see below, as coupling agent but in which the amount of coupling agent has been adjusted so as to be isomolar with respect to the amount of coupling agent of formula (I-a) of composition C2 according to the invention, in terms of functional group providing bonding to the inorganic filler (isomolar amount of silicon).

The conventional coupling agent used in control composition C1 is TESPT. It is recalled that TESPT is bis(3-triethoxysilylpropyl) tetrasulphide having the structural formula (Et=ethyl):

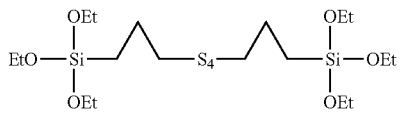

The conventional coupling agent used in control compositions C3 and C'3 is the azosilane of structural formula (III) (Et=ethyl):

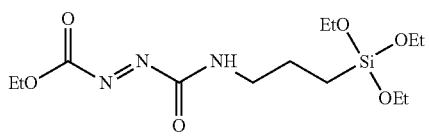 [SMILES: CCOC(=O)/N=N/C(=O)NCCC[Si](OCC)(OCC)OCC]

Tables 1 and 2 give the formulation of the various compositions (Table 1—content of the various products expressed as phr or parts by weight per hundred parts of elastomer (rubber)) and also their properties after curing (approximately 25 min at 150° C.); the vulcanization system is composed of sulphur and sulphenamide.

Examination of the results from Table 2 firstly shows that composition C2 according to the invention, comprising a coupling agent of formula (I-a), compared with control composition C1 comprising the TESPT coupling agent, has properties that are significantly improved regarding the reinforcement of the composition (MA300/MA100) and also the hysteresis (substantially reduced values of tan(δ)$_{max}$), while maintaining quasi-similar properties in terms of properties at break (stress and elongation at break).

Furthermore, the comparison of composition C3 that is not in accordance with the invention, comprising another coupling agent of formula with an amount corresponding, with respect to composition C2 according to the invention, to an identical number of functions providing bonding with the filler, has both degraded elongation at break properties and degraded reinforcement properties (in particular the MA300 modulus is unable to be measured).

Test 2

The objective of this test is to demonstrate the improved properties of a rubber composition according to the invention comprising the novel coupling agent as a blend with another coupling agent conventionally used in rubber compositions for tire treads having silica as reinforcing filler, compared with a control composition comprising this conventionally used coupling agent alone and also with a composition comprising a blend of two conventionally used coupling agents.

For this, four compositions based on a diene elastomer (natural rubber, NR) reinforced with a highly dispersible silica (HDS) were prepared, these compositions essentially differing by the following technical characteristics:
  composition C'1 is identical to composition C1 of test 1 with the exception of the amount of the TESPT coupling agent,
  composition C4 is a composition according to the invention comprising, as coupling agent, a blend composed of 50% of TESPT compound with respect to the amount of TESPT in composition C'1, and of azosilane compound of formula (I-a) with an isomolar amount of silicon with respect to these 50% of TESPT,
  composition C5 is a second control composition comprising, as coupling agent, a blend composed of 50% of TESPT compound with respect to the amount of TESPT in composition C'1, and an azosilane compound of formula (III) with an isomolar amount, with respect to the amount of coupling agent de formula (I-a) of composition C4 according to the invention, in terms of functional group providing bonding to the inorganic filler (isomolar amount of silicon).

Tables 3 and 4 give the formulation of the various compositions (Table 3—content of the various products expressed as phr or parts by weight per hundred parts of elastomer (rubber)) and also their properties after curing (approximately 25 min at 150° C.); the vulcanization system is composed of sulphur and sulphenamide.

Table 4 shows that composition C4 according to the invention, comprising, as coupling agent, a blend of coupling agent of formula (I-a) and of TESPT compound, compared with control composition C'1 comprising the TESPT coupling agent alone and also with composition C5 comprising a blend of azosilane compound of formula (III) and of TESPT compound, has:
  properties that are significantly improved regarding the reinforcement of the composition (MA300/MA100) with respect to composition C'1 and of the same order of magnitude as for composition C5,
  significantly improved properties regarding the hysteresis (substantially reduced values of tan(δ)$_{max}$) with respect to the two compositions C'1 and C5,
  and properties at break that are very close to those of the composition C'1, unlike the composition C5 which has properties at break (stress and elongation at break) that are degraded relative to the composition C1.

Test 3

The objective of this test is to demonstrate the improved properties of rubber compositions according to the invention comprising a novel coupling agent compared with a control composition using a coupling agent conventionally used in rubber compositions for tire treads having silica as reinforcing filler.

For this, three compositions based on a diene elastomer (natural rubber, NR) reinforced with a highly dispersible silica (HDS) were prepared, these compositions essentially differing by the following technical characteristics:
  composition C'1 is identical to composition C'1 of test 2, including TESPT as coupling agent,
  composition C6 is a composition according to the invention comprising the azosilane compound of formula (I-b) as coupling agent with a number of moles identical to that of the TESPT of the first control composition (isomolar amount of silicon),
  composition C7 is a composition according to the invention comprising the azosilane compound of formula (I-c) as coupling agent with a number of moles identical to that of the TESPT of the first control composition (isomolar amount of silicon).

Tables 5 and 6 give the formulation of the various compositions (Table 5—content of the various products expressed as phr or parts by weight per hundred parts of elastomer (rubber)) and also their properties after curing (approximately 25 min at 150° C.); the vulcanization system is composed of sulphur and sulphenamide.

Table 6 shows that compositions C6 and C7 according to the invention, comprising as coupling agent respectively a coupling agent of formula (I-b) and a coupling agent of formula (I-c), compared with control composition C'1 comprising the TESPT coupling agent, has properties that are very significantly improved regarding the reinforcement of the composition (MA300/MA100) and also the hysteresis (substantially reduced values of $\tan(\delta)_{max}$).

It clearly appears that a composition according to the invention comprising, as coupling agent, an azosilane compound of formula (I) alone or as a blend, in particular with another coupling agent conventionally used in tire compositions, makes it possible to obtain improved properties (reinforcement, hysteresis) with respect to the control compositions.

TABLE 1

| Composition | C1 | C2 | C3 |
|---|---|---|---|
| NR (1) | 100 | 100 | 100 |
| Silica (2) | 55 | 55 | 55 |
| Coupling agent (3) | 5 | — | — |
| Coupling agent (4) | — | — | 7 |
| Coupling agent (5) | — | 5.2 | — |
| Carbon black (6) | 3 | 3 | 3 |
| Paraffin | 1 | 1 | 1 |
| Antioxidant (7) | 1.5 | 1.5 | 1.5 |
| TMQ (8) | 1 | 1 | 1 |
| ZnO (9) | 2.7 | 2.7 | 2.7 |
| Stearic acid (10) | 2.5 | 2.5 | 2.5 |
| Sulphur | 1.5 | 1.5 | 1.5 |
| Accelerator (11) | 1.8 | 1.8 | 1.8 |

(1) Natural rubber;
(2) Silica "ZEOSIL 1165 MP" from Rhodia in the form of microbeads (BET and CTAB: approximately 150-160 m²/g);
(3) TESPT ("SI69" from Evonik-Degussa);
(4) Azosilane compound of formula III;
(5) Azosilane compound of formula (I-a);
(6) N234 (from Evonik-Degussa);
(7) N-1,3-dimethylbutyl-N-phenyl-para-phenylenediamine ("Santoflex 6-PPD" from Flexsys);
(8) TMQ
(9) Zinc oxide (industrial grade - from Umicore);
(10) Stearic acid ("Pristerene 4931" - from Uniqema);
(11) N-cyclohexyl-2-benzothiazyl-sulfenamide ("Santocure CBS" from Flexsys).

TABLE 2

| Composition Properties after curing | C1 | C2 | C3 |
|---|---|---|---|
| Elongation at break (%) 60° C. | 636 | 504 | 189 |
| Stress at break (MPa) 60° C. | 25.4 | 24.0 | 8.0 |
| MA300/MA100 23° C. | 0.95 | 1.46 | * |
| $\tan(\delta)_{max}$ 60° C. | 0.175 | 0.127 | 0.130 |

* cannot be measeured

TABLE 3

| Composition | C'1 | C4 | C5 |
|---|---|---|---|
| NR (1) | 100 | 100 | 100 |
| Silica (2) | 55 | 55 | 55 |
| Coupling agent (3) | 5.5 | 2.8 | 2.8 |
| Coupling agent (4) | — | — | 3.9 |
| Coupling agent (5) | — | 2.9 | — |
| Carbon black (6) | 3 | 3 | 3 |
| Paraffin | 1 | 1 | 1 |
| Antioxidant (7) | 1.5 | 1.5 | 1.5 |
| TMQ (8) | 1 | 1 | 1 |
| ZnO (9) | 2.7 | 2.7 | 2.7 |
| Stearic acid (10) | 2.5 | 2.5 | 2.5 |
| Sulphur | 1.5 | 1.5 | 1.5 |
| Accelerator (11) | 1.8 | 1.8 | 1.8 |

TABLE 4

| Composition Properties after curing | C'1 | C4 | C5 |
|---|---|---|---|
| Elongation at break (%) 60° C. | 617 | 559 | 513 |
| Stress at break (MPa) 60° C. | 24.6 | 25.3 | 23.0 |
| MA300/MA100 23° C. | 0.97 | 1.26 | 1.28 |
| $\tan(\delta)_{max}$ 60° C. | 0.180 | 0.137 | 0.143 |

TABLE 5

| Composition | C'1 | C6 | C7 |
|---|---|---|---|
| NR(1) | 100 | 100 | 100 |
| Silica (2) | 55 | 55 | 55 |
| Coupling agent (3) | 5.5 | — | — |
| Coupling agent (12) | — | 13 | — |
| Coupling agent (13) | — | — | 20.6 |
| Carbon black (6) | 3 | 3 | 3 |
| Paraffin | 1 | 1 | 1 |
| Antioxidant (7) | 1.5 | 1.5 | 1.5 |
| TMQ (8) | 1 | 1 | 1 |
| ZnO (9) | 2.7 | 2.7 | 2.7 |
| Stearic acid (10) | 2.5 | 2.5 | 2.5 |
| Sulphur | 1.5 | 1.5 | 1.5 |
| Accelerator (11) | 1.8 | 1.8 | 1.8 |

(12) Azosilane compound of formula (I-b)
(13) Azosilane compound of formula (I-c)

TABLE 6

| Composition Properties after curing | C'1 | C6 | C7 |
|---|---|---|---|
| MA300 MA100 23° C. | 0.93 | 1.46 | 1.49 |
| $\tan(\delta)_{max}$ 60°C. | 0.177 | 0.084 | 0.073 |

The invention claimed is:

1. A tire rubber composition based on at least one diene elastomer, an inorganic filler as reinforcing filler, and a coupling agent providing the bonding between the inorganic filler and the diene elastomer, wherein the coupling agent is an azosilane compound of following formula (I)

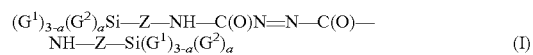

$(G^1)_{3-a}(G^2)_a Si\text{—}Z\text{—}NH\text{—}C(O)N\text{=}N\text{—}C(O)\text{—}NH\text{—}Z\text{—}Si(G^1)_{3-a}(G^2)_a$     (I)

wherein:
$G^1$, identical to or different from one another, each represent a monovalent hydrocarbon group chosen from branched or unbranched, unsubstituted or substituted alkyls, having from 1 to 18 carbon atoms, unsubstituted or substituted cycloalkyls or aryls, having from 5 to 18 carbon atoms,
$G^2$, identical to or different from one another, each represent a hydroxyl group or a monovalent group $(G^3)_n\text{-}OG^1$ in which $G^3$ is a divalent linking group having from 1 to 18 carbon atoms and comprising one or more heteroatoms chosen from O, S, Si and N, n being a number equal to or higher than 0 and less than or equal to 18, and at least one $G^2$ represents a monovalent group $(G^3)_n\text{-}OG^1$ wherein n is higher than 0,
Z represents a divalent linking group having from 1 to 18 carbon atoms,
a is equal to 1, 2 or 3.

2. The composition according to claim 1, wherein a is equal to 3.

3. The composition according to claim 2, wherein the azosilane compound of formula (I) is chosen from the following compounds:

(EtO)(RO)$_2$Si—CH$_2$—CH$_2$—CH$_2$—NH—CO—N═N—CO—NH—CH$_2$—CH$_2$—CH$_2$—Si(EtO)(RO)$_2$, (RO)(EtO)$_2$Si—CH$_2$—CH$_2$—CH$_2$—NH—CO—N═N—CO—NH—CH$_2$—CH$_2$—CH$_2$—Si(RO)(EtO)$_2$ wherein Et=ethyl and R═C$_{13}$H$_{27}$(OCH$_2$CH$_2$)$_5$.

4. The composition according to claim 1, wherein Z is chosen from C$_1$-C$_{18}$ alkylenes and C$_6$-C$_{12}$ arylenes.

5. The composition according to claim 4, wherein Z is chosen from C$_1$-C$_{10}$ alkylenes.

6. The composition according to claim 5, wherein Z is a propylene.

7. The composition according to claim 5, wherein Z is C$_1$-C$_4$ alkylene.

8. The composition according to claim 1, wherein n is equal to or higher than 1 and less than or equal to 18.

9. The composition according to claim 8, wherein G$^3$ is a C$_1$-C$_{12}$ oxy-alkylene.

10. The composition according to claim 9, wherein G$^3$ is a C$_1$-C$_4$ oxy-alkylene.

11. The composition according to claim 10, wherein G$^3$ is an oxy-ethylene or oxy-propylene.

12. The composition according to claim 1, wherein the diene elastomer is chosen from the group consisting of polybutadienes, synthetic polyisoprenes, natural rubber, butadiene copolymers, isoprene copolymers and the mixtures of these elastomers.

13. The composition according to claim 1, wherein the inorganic filler is a filler of the siliceous or aluminous type.

14. The composition according to claim 1, wherein the amount of reinforcing inorganic filler is greater than 50 phr.

15. The composition according to claim 14, wherein the amount of reinforcing inorganic filler is greater than 50 phr and less than 140 phr.

16. The composition according to claim 1, further comprising a second coupling agent.

17. The composition according to claim 16, wherein the second coupling agent is a silane sulphide compound corresponding to the formula (II):

Y$^1$—Z$^1$—S$_x$—Z$^2$—Y$^2$(II) wherein: x is a number from 2 to 8; Z$^1$ and Z$^2$, which are identical or different, each represent a divalent hydrocarbon radical comprising from 1 to 18 carbon atoms; Y$^1$ and Y$^2$, which are identical or different, each correspond to one of the following formulae: wherein: the R$^1$ radicals, which are unsubstituted or substituted and identical to or different from one another, represent a C$_1$-C$_{18}$ alkyl, C$_5$-C$_{18}$ cycloalkyl or C$_8$-C$_{18}$ aryl group; the R$^2$ radicals, which are unsubstituted or substituted and identical to or different from one another, represent a hydroxyl, C$_1$-C$_{18}$ alkoxyl or C$_5$-C$_{18}$ cycloalkoxyl group.

18. The composition according to claim 17, wherein Z$^1$ and Z$^2$ are chosen from the group consisting of C$_1$-C$_{10}$ alkylenes.

19. The composition according to claim 18, wherein Z$^1$ and Z$^2$ are propylene.

20. The composition according to claim 18, wherein Z$^1$ and Z$^2$ are C$_1$-C$_4$ alkylene.

21. The composition according to claim 17, wherein the R$^1$ radicals are chosen from C$_1$-C$_4$ alkyls.

22. The composition according to claim 21, wherein the R$^1$ radicals are methyl.

23. The composition according to claim 17, wherein the R$^2$ radicals are chosen from the group consisting of hydroxyl and C$_1$-C$_4$ alkoxyls.

24. The composition according to claim 23, wherein the R$^2$ radicals are chosen from the group consisting of hydroxyl, methoxyl, and ethoxyl.

25. The composition according to claim 17, wherein x is a number from 2 to 5.

26. The composition according to claim 1, wherein the coupling agent has an overall content that represents between 2% and 20% by weight with respect to the amount of reinforcing inorganic filler.

27. The composition according to claim 26, wherein the overall content of coupling agent is between 2 and 15 phr.

28. The composition according to claim 27, wherein the overall content of coupling agent is between 2 and 12 phr.

29. The composition according to claim 26, wherein the overall content of coupling agent is between 2% and 15% by weight.

30. The composition according to claim 1, further comprising a covering agent selected from the group consisting of hydroxylated or hydrolysable silanes, polyols, polyethers, esters, amines, hydroxylated or hydrolysable polysiloxanes, and the mixtures of such compounds.

31. The composition according to claim 30, wherein the covering agent is an α,ω-(dihydroxy)polyorganosiloxane oil.

32. A tire or semi-finished product, comprising a rubber composition according to claim 1.

33. A tire tread, comprising a rubber composition according to claim 1.

34. A tire rubber composition based on at least one diene elastomer, an inorganic filler as reinforcing filler, and a coupling agent providing the bonding between the inorganic filler and the diene elastomer, wherein the coupling agent is an azosilane compound of following formula (I)

$$(G^1)_{3-a}(G^2)_a\text{Si—Z—NH—C(O)N═N—C(O)—NH—Z—Si}(G^1)_{3-a}(G^2)_a \quad (I)$$

wherein:
G$^1$, identical to or different from one another, each represent a monovalent hydrocarbon group chosen from branched or unbranched, unsubstituted or substituted alkyls, having from 1 to 18 carbon atoms, unsubstituted or substituted cycloalkyls or aryls, having from 5 to 18 carbon atoms, G$^2$, identical to or different from one another, each represent a hydroxyl group or a monovalent group (G$^3$)$_n$-OG$^1$ in which G$^3$ is a divalent linking group having from 1 to 18 carbon atoms and comprising one or more heteroatoms chosen from O, S, Si and N, n being a number equal to or higher than 0 and less than or equal to 18, Z represents a divalent linking group having from 1 to 18 carbon atoms, and wherein Z comprises one or more heteroatoms chosen from O, S, N and Si, and a is equal to 1, 2 or 3.

* * * * *